US009784903B2

(12) United States Patent
Liu et al.

(10) Patent No.: US 9,784,903 B2
(45) Date of Patent: Oct. 10, 2017

(54) LIGHT GUIDE UNIT AND LIGHT SOURCE MODULE

(71) Applicants: Chin-Ku Liu, Hsin-Chu (TW); Jhong-Hao Wu, Hsin-Chu (TW)

(72) Inventors: Chin-Ku Liu, Hsin-Chu (TW); Jhong-Hao Wu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 287 days.

(21) Appl. No.: 14/681,106

(22) Filed: Apr. 8, 2015

(65) Prior Publication Data
US 2015/0346415 A1    Dec. 3, 2015

(30) Foreign Application Priority Data

May 30, 2014    (CN) .......................... 2014 1 0238882

(51) Int. Cl.
*F21V 8/00*    (2006.01)
(52) U.S. Cl.
CPC ......... *G02B 6/0055* (2013.01); *G02B 6/0061* (2013.01); *G02B 6/002* (2013.01); *G02B 6/003* (2013.01); *G02B 6/0046* (2013.01); *G02B 6/0048* (2013.01)
(58) Field of Classification Search
CPC .... G02B 6/0055; G02B 6/0061; G02B 6/003; G02B 6/002; G02B 6/0046; G02B 6/0048
See application file for complete search history.

(56) References Cited

U.S. PATENT DOCUMENTS

| 9,507,158 B2 * | 11/2016 | Shikii ................. G02B 27/2214 |
| 2013/0308185 A1 | 11/2013 | Robinson et al. |
| 2016/0266302 A1 * | 9/2016 | Seen ...................... G02F 1/1323 |

FOREIGN PATENT DOCUMENTS

| CN | 102472918 | 5/2012 |
| CN | 103329029 | 9/2013 |
| TW | 201323946 | 6/2013 |

\* cited by examiner

*Primary Examiner* — David V Bruce
(74) *Attorney, Agent, or Firm* — Jianq Chyun IP Office

(57) ABSTRACT

A light guide unit is adapted to be disposed beside a light source. The light guide unit includes a light guide plate and a plurality of optical structures. The light guide plate has a bottom surface, a light emitting surface, a light incident surface, a side surface, a first connecting surface, and a second connecting surface. The bottom surface is opposite to the light emitting surface. The light incident surface, the side surface, the first connecting surface, and the second connecting surface are respectively connected between the bottom surface and the light emitting surface. The light incident surface is disposed between the light source and the side surface. The optical structures protrude on the side surface, the first connecting surface, and the second connecting surface, and together form a Fresnel lens structure. A light source module is also provided.

24 Claims, 7 Drawing Sheets

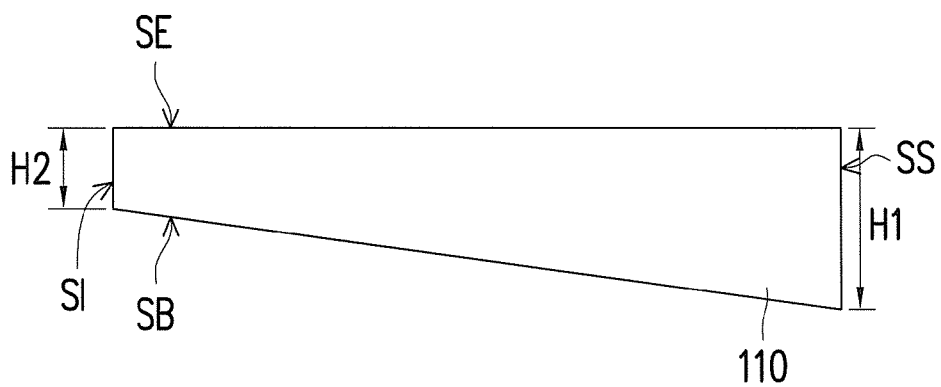
FIG. 3B'
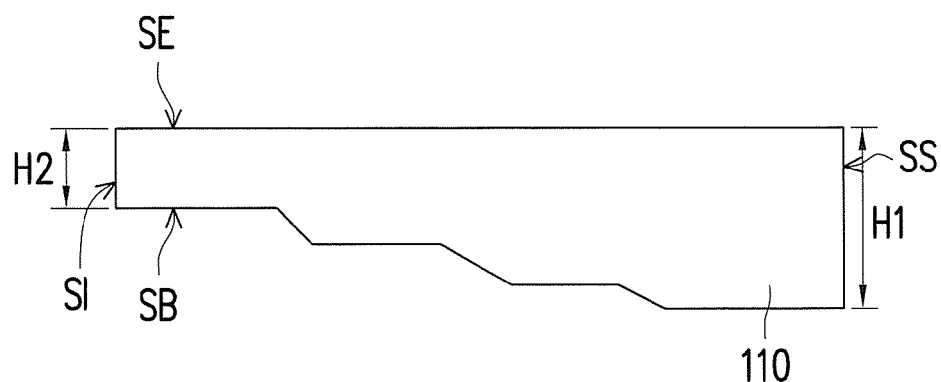
FIG. 3B"

LIGHT GUIDE UNIT AND LIGHT SOURCE MODULE

CROSS-REFERENCE TO RELATED APPLICATION

This application claims the priority benefit of Chinese application serial no. 201410238882.5, filed on May 30, 2014. The entirety of the above-mentioned patent application is hereby incorporated by reference herein and made a part of this specification.

BACKGROUND OF THE INVENTION

Field of the Invention

The invention relates to a light guide unit and a light source module and particularly relates to a light guide unit and a light source module capable of improving non-uniform brightness.

Description of Related Art

According to the positions of the light sources, light source modules can be roughly divided into direct-lit light source modules and edge-lit light source modules. In contrast to the direct-lit light source module, the light source of the edge-lit light source module is generally disposed at a side of the light guide plate. Therefore, the edge-lit light source module is usually thinner and has broader application. For example, the edge-lit light source module can be applied to sequential naked eye stereoscopic display devices.

FIG. 1 is a schematic diagram illustrating an operating principle of naked eye stereoscopic display technology. FIG. 2 illustrates an optical simulation result of the light source module of FIG. 1. Specifically, FIG. 2 only illustrates the optical simulation result of the first light source group of FIG. 1. Referring to FIG. 1 and FIG. 2, in the edge-lit light source module applied to the sequential naked eye stereoscopic display device, the light sources can usually be divided into a first light source group LS1 and a second light source group LS2, wherein the first light source group LS1 and the second light source group LS2 are turned on alternately and coordinated with a display panel such that the right eye E1 and the left eye E2 of the user can respectively receive display images with parallax to form a stereo image in the user's head.

Generally speaking, a side surface SS of a light guide plate LGP, opposite to a light incident surface SI, usually has an arc structure AA for respectively guiding a light beam B1 from the first light source group LS1 and a light beam B2 from the second light source group LS2 to the right eye E1 and the left eye E2 of the user. As shown in FIG. 2, due to the restricted divergence angle and position of the light emitting unit (e.g. light emitting diode) in the first light source group LS1, it is difficult for a light beam B1' to reach an area of the arc structure AA that is further away from the first light source group LS1. Moreover, a large-angle light beam B1'' exits the light guide plate LGP directly after being transmitted to a connecting surface SC of the light guide plate LGP that is near the first light source group LS1. For the above reasons, two dark areas A1 and A2 are generated at diagonal sides of the light guide plate LGP. This phenomenon causes non-uniform brightness of the display images and affects the visual effect. Thus, how to improve the non-uniform brightness of the light source module is an important issue that needs to be overcome.

P.R.C. Patent Publication No. 103329029A and U.S. Patent Publication No. 20130308185A1 respectively disclose disposing a Fresnel lens structure on the side surface of the light guide plate opposite to the light incident surface. P.R.C. Patent Publication No. 102472918A discloses an optical system that includes an additional optical element resembling the Fresnel lens structure. Taiwan Patent Publication No. 201323946A1 discloses a light guide plate having an inclined surface connected with a top surface, and a Fresnel lens structure is disposed on the inclined surface.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a light guide unit and a light source module, wherein the light guide unit is adapted for improving a dark area problem, such that the light source module using the light guide unit can improve the problem of non-uniform brightness.

Other features and advantages of the embodiments of the invention are illustrated by the technical features broadly embodied and described as follows.

In order to achieve at least one of the features, an embodiment of the invention provides a light guide unit adapted to be disposed beside a light source. The light guide unit includes a light guide plate and a plurality of optical structures. The light guide plate has a bottom surface, a light emitting surface, a light incident surface, a side surface, a first connecting surface, and a second connecting surface. The bottom surface is opposite to the light emitting surface. The light incident surface, the side surface, the first connecting surface, and the second connecting surface are respectively connected between the bottom surface and the light emitting surface. The light incident surface is disposed between the light source and the side surface. The optical structures protrude on the side surface, the first connecting surface, and the second connecting surface, and together form a Fresnel lens structure.

In another embodiment of the invention, the optical structures include at least one first optical structure protruding on the side surface, a plurality of second optical microstructures protruding on the first connecting surface, and a plurality of third optical microstructures protruding on the second connecting surface.

In another embodiment of the invention, each of the second optical microstructures protruding on the first connecting surface and each of the third optical microstructures protruding on the second connecting surface respectively include a first surface parallel to the side surface and a curved second surface, wherein the first surface is disposed between the second surface and the light source.

In another embodiment of the invention, a reflective layer is formed on each of the second surfaces.

In another embodiment of the invention, each of the second surfaces is a continuous cambered surface.

In another embodiment of the invention, a tangent line slope of each tangent of each of the second surfaces with respect to the light incident surface gradually decreases in a direction from the light incident surface to the side surface.

In another embodiment of the invention, a refractive index of at least one of the optical structures is different from a refractive index of the light guide plate.

In another embodiment of the invention, the light incident surface is a planar surface.

In another embodiment of the invention, the light incident surface is a continuous zigzag surface.

In another embodiment of the invention, the light incident surface is a continuous curved surface.

In another embodiment of the invention, a thickness of the light guide plate on the side surface is larger than a thickness of the light guide plate on the light incident surface, and a partial thickness of the light guide plate gradually decreases in a direction from the side surface to the light incident surface.

In another embodiment of the invention, a thickness of the light guide plate on the side surface is larger than a thickness of the light guide plate on the light incident surface, and a partial thickness of the light guide plate remains unchanged in the direction from the side surface to the light incident surface.

An embodiment of the invention provides a light source module, including a light source and a light guide unit. The light guide unit includes a light guide plate and a plurality of optical structures. The light guide plate includes a bottom surface, a light emitting surface, a light incident surface, a side surface, a first connecting surface, and a second connecting surface. The bottom surface is opposite to the light emitting surface. The light incident surface, the side surface, the first connecting surface, and the second connecting surface are respectively connected between the bottom surface and the light emitting surface. The light incident surface is disposed between the light source and the side surface. The optical structures protrude on the side surface, the first connecting surface, and the second connecting surface, and together form a Fresnel lens structure. The light source includes a first light source group and a second light source group. The Fresnel lens structure is adapted to transmitting a first light beam emitted by the first light source group in a first direction and transmitting a second light beam emitted by the second light source group in a second direction. The second direction intersects the first direction.

In another embodiment of the invention, the optical structures include at least one first optical structure protruding on the side surface, a plurality of second optical microstructures protruding on the first connecting surface, and a plurality of third optical microstructures protruding on the second connecting surface.

In another embodiment of the invention, each of the second optical microstructures protruding on the first connecting surface and each of the third optical microstructures protruding on the second connecting surface respectively include a first surface parallel to the side surface and a curved second surface, wherein the first surface is disposed between the second surface and the light source.

In another embodiment of the invention, a reflective layer is formed on each of the second surfaces.

In another embodiment of the invention, each of the second surfaces is a continuous cambered surface.

In another embodiment of the invention, a tangent line slope of each tangent of each of the second surfaces with respect to the light incident surface gradually decreases in a direction from the light incident surface to the side surface.

In another embodiment of the invention, a refractive index of at least one of the optical structures is different from a refractive index of the light guide plate.

In another embodiment of the invention, the light incident surface is a planar surface.

In another embodiment of the invention, the light incident surface is a continuous zigzag surface.

In another embodiment of the invention, the light incident surface is a continuous curved surface.

In another embodiment of the invention, a thickness of the light guide plate on the side surface is larger than a thickness of the light guide plate on the light incident surface, and a partial thickness of the light guide plate gradually decreases in a direction from the side surface to the light incident surface.

In another embodiment of the invention, a thickness of the light guide plate on the side surface is larger than a thickness of the light guide plate on the light incident surface, and a partial thickness of the light guide plate remains unchanged in the direction from the side surface to the light incident surface.

Based on the above, in the embodiments of the invention, a plurality of optical structures are disposed on the first connecting surface and the second connecting surface of the light guide plate to prevent a large-angle light beam transmitted to the first connecting surface and the second connecting surface from emitting out of the light guide plate directly through the first connecting surface or the second connecting surface, so as to improve light utilization. In addition, the optical structures protruding on the side surface, the first connecting surface, and the second connecting surface together form the Fresnel lens structure for properly guiding light beams emitted by different light source groups toward the predetermined directions (e.g. directions of the left and right eyes), so as to generate a favorable display effect, reduce crosstalk, and effectively improve the dark area problem. In the field of stereoscopic display, the left-eye and right-eye images interfere with each other. For example, when the left eye sees the image that is intended for the right eye or when the right eye sees the image that is intended for the left eye, image interference occurs, and this phenomenon is called crosstalk.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

FIG. 3B' is a schematic cross-sectional view of the second embodiment taken along the line A-A' of FIG. 3A.

FIG. 3B" is a schematic cross-sectional view of the third embodiment taken along the line A-A' of FIG. 3A.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 3A:
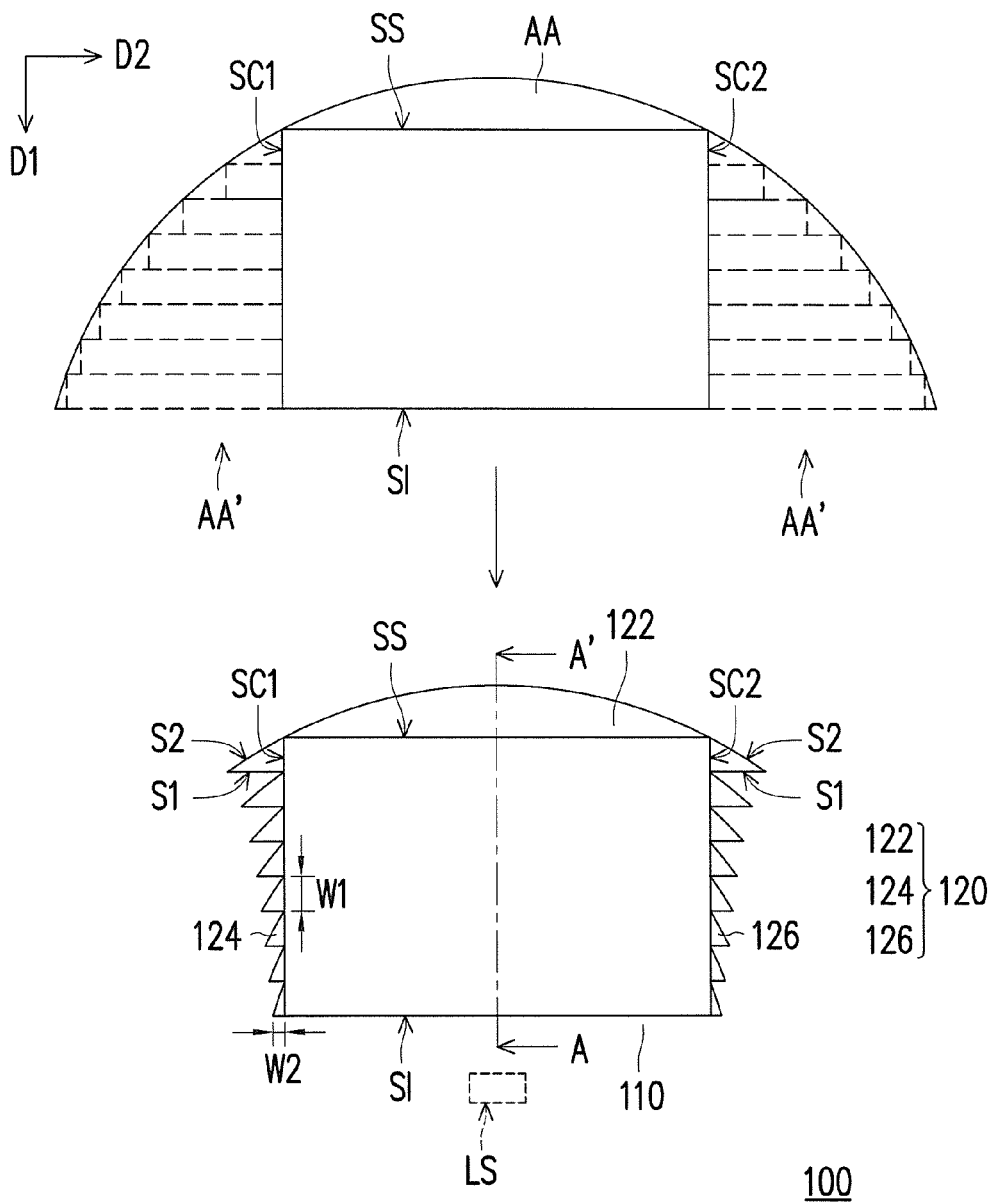
FIG. 3A is a schematic top view of a light guide unit according to the first embodiment of the invention.
Figure 3B:
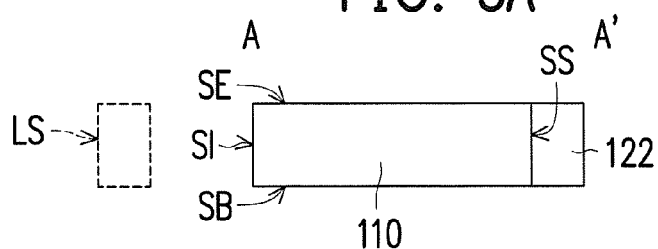
FIG. 3B is a schematic cross-sectional view of the first embodiment taken along the line A-A' of FIG. 3A.

FIG. 3A is a schematic top view of a light guide unit according to the first embodiment of the invention. FIG. 3B is a schematic cross-sectional view of the first embodiment taken along the line A-A' of FIG. 3A. FIG. 3B' is a schematic cross-sectional view of the second embodiment taken along the line A-A' of FIG. 3A. FIG. 3B" is a schematic cross-sectional view of the third embodiment taken along the line A-A' of FIG. 3A. With reference to FIG. 3A and FIG. 3B, a light guide unit 100 is adapted to be disposed beside a light source LS and the light guide unit 100 includes a light guide plate 110 and a plurality of optical structures 120.

The light guide plate 110 has a bottom surface SB, a light emitting surface SE, a light incident surface SI, a side surface SS, a first connecting surface SC1, and a second connecting surface SC2. The bottom surface SB is opposite to the light emitting surface SE, and the bottom surface SB and the light emitting surface SE are parallel to each other, for example. In this embodiment, a thickness of the light guide plate 110 may be a fixed value. However, it should be noted that the invention is not limited thereto. As shown in FIG. 3B', a thickness H1 of the light guide plate 110 on the side surface SS may be larger than a thickness H2 of the light guide plate 110 on the light incident surface SI, and a partial thickness of the light guide plate 110 decreases gradually in a direction from the side surface SS to the light incident surface SI. For example, the light guide plate 110 may be a wedge-shaped light guide plate. That is to say, a cross-section of the light guide plate 110 along the line A-A' has a wedge shape. On the other hand, as shown in FIG. 3B", the thickness H1 of the light guide plate 110 on the side surface SS may be larger than the thickness H2 of the light guide plate 110 on the light incident surface SI, and the partial thickness of the light guide plate 110 may remain unchanged in the direction from the side surface SS to the light incident surface SI. For example, the light guide plate 110 may be a stepped light guide plate. That is to say, the cross-section of the light guide plate 110 along the line A-A' has a stepped shape.

Further, with reference to FIG. 3A and FIG. 3B, the light incident surface SI, the side surface SS, the first connecting surface SC1, and the second connecting surface SC2 are respectively connected between the bottom surface SB and the light emitting surface SE. The light incident surface SI is disposed between the side surface SS and the light source LS.

Figure 2:
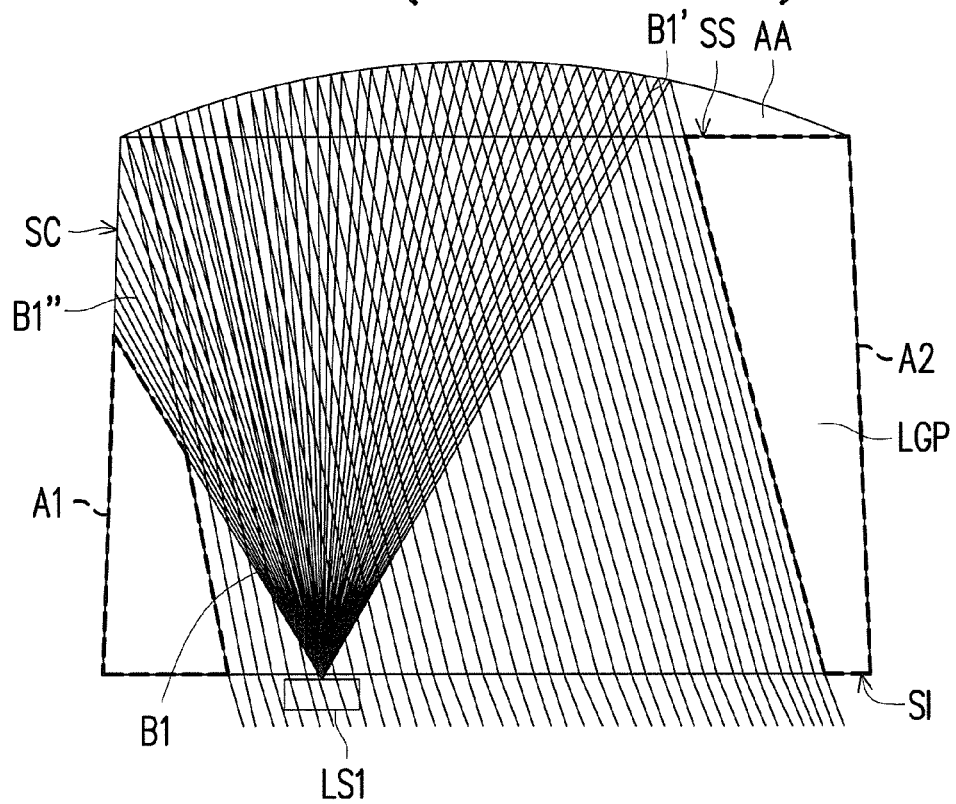
FIG. 2 illustrates an optical simulation result of a light source module of FIG. 1.

The optical structures 120 protrude on the side surface SS, the first connecting surface SC1, and the second connecting surface SC2. The optical structures 120 together form a Fresnel lens structure. In more detail, the dark area A1 near a first light source group LS1 in FIG. 2 is caused mainly because a large angle light beam B1" transmitted to the connecting surface SC exits the connecting surface SC directly. To solve this problem, in this embodiment, the arc structure AA of FIG. 2 is extended to both sides, as shown in the upper part of FIG. 3A, and the first connecting surface SC1 and the second connecting surface SC2 are respectively provided with an arc structure AA'. A cambered surface of the arc structure AA' is a continuation of a cambered surface of the arc structure AA, such that the light beam emitted to the first connecting surface SC1 (or the second connecting surface SC2) and reflected by the arc structure AA' and the light beam emitted to the side surface SS and reflected by the arc structure AA are transmitted in the same direction. However, as illustrated by the upper part of FIG. 3A, the protruding arc structure AA' significantly increases the size of the light guide unit and is not suitable for use in a light source module of a display device. Therefore, this embodiment utilizes the Fresnel lens design to reduce the size of the arc structure AA'.

In more detail, in this embodiment, the arc structure AA' connected with the first connecting surface SC1 and the second connecting surface SC2 is divided into a plurality of regions with equal widths along a direction D1 perpendicular to the light incident surface SI, and a partial rectangular area of each region (as indicated by the broken lines) is removed to form the light guide unit 100 shown in the lower part of FIG. 3A, wherein the optical structures 120 include a first optical structure 122 protruding on the side surface SS, a plurality of second optical microstructures 124 protruding on the first connecting surface SC1, and a plurality of third optical microstructures 126 protruding on the second connecting surface SC2. The first optical structure 122, the second optical microstructures 124, and the third optical microstructures 126 together form the Fresnel lens structure.

To be more detailed, the second optical microstructures 124 and the third optical microstructures 126 are disposed symmetrically on two opposite sides of the light guide plate 110. In addition, the second optical microstructures 124 and the third optical microstructures 126 have equal widths W1 in the direction D1, but the widths W2 thereof in a direction D2 from the first connecting surface SC1 to the second connecting surface SC2 gradually decrease along the direction D1. However, it should be noted that the invention is not limited thereto.

Figure 4:
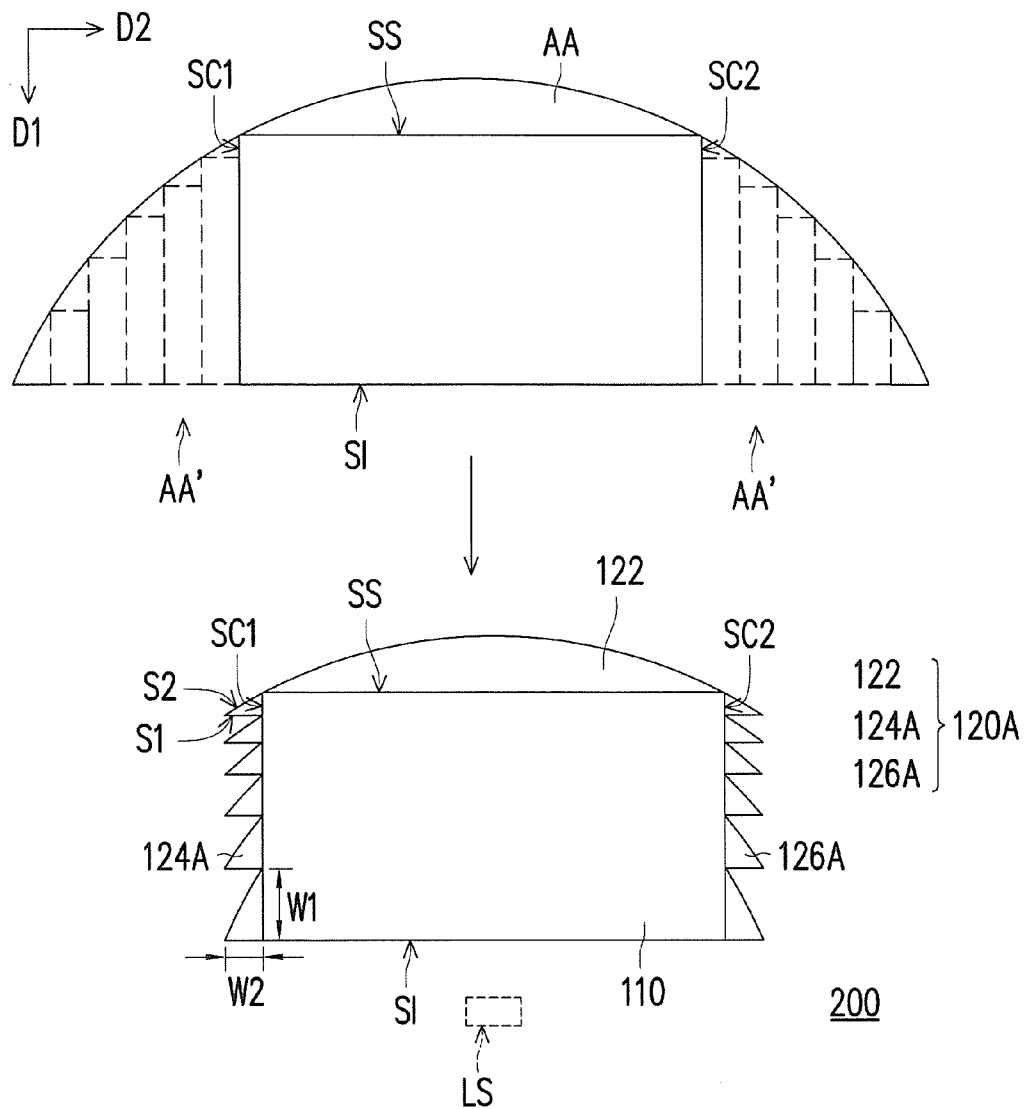
FIG. 4 is a schematic top view of a light guide unit according to the second embodiment of the invention.

FIG. 4 is a schematic top view of a light guide unit according to the second embodiment of the invention. As illustrated by the upper part of FIG. 4, the arc structure AA' connected with the first connecting surface SC1 and the second connecting surface SC2 may also be divided into a plurality of regions having equal widths along the direction D2, and a partial rectangular area of each region (as indicated by the broken lines) is removed to form a light guide unit 200 as shown by the lower part of FIG. 4, wherein optical structures 120A include the first optical structure 122 protruding on the side surface SS, a plurality of second optical microstructures 124A protruding on the first connecting surface SC1, and a plurality of third optical microstructures 126A protruding on the second connecting surface SC2. The first optical structure 122, the second optical microstructures 124A, and the third optical microstructures 126A together form the Fresnel lens structure.

In the embodiment of FIG. 4, the second optical microstructures 124A and the third optical microstructures 126A are also disposed symmetrically on two opposite sides of the light guide plate 110. In addition, the second optical microstructures 124A and the third optical microstructures 126A have equal widths W2 in the direction D2, but the widths W1 thereof in the direction D1 gradually increase in the direction from the side surface SS to the light incident surface SI. It should be noted that, although only one first optical structure 122 is illustrated in the embodiments of FIG. 3A and FIG. 4, the invention is not limited thereto. In another embodiment, the number of the first optical structures 122 that protrude on the side surface SS may be plural, or the first optical structure 122 may be similar to the second optical microstructures 124A that the first optical structure 122 is also modified into the Fresnel lens structure that has multiple microstructures. Moreover, in order to clearly illustrate the second optical microstructures 124 and 124A and the third optical microstructures 126 and 126A, the microstructures are enlarged in FIG. 3A and FIG. 4. The actual sizes and numbers of the second optical microstructures 124 and 124A and the third optical microstructures 126 and 126A may be varied according to the design requirements.

In practice, a method of forming the light guide unit 100 (or the light guide unit 200) may include forming the light guide plate 110 together with the optical structures 120 (or the optical structures 120A) by injection molding, or forming the light guide plate 110 and the optical structures 120 (or the optical structures 120A) separately and then bonding the light guide plate 110 to the optical structures 120 (or the optical structures 120A). The bonding may be performed using an optical adhesive or a double-sided adhesive. The light guide plate 110 and the optical structures 120 (or the optical structures 120A) may be formed using different materials. Thus, different materials may be selected to fabricate the light guide plate 110 and the optical structures 120 (or the optical structures 120A) considering the optical effects required, the material costs, or the processing difficulty. In other words, a refractive index of the optical structures 120 (or the optical structures 120A) may be different from a refractive index of the light guide plate 110. However, it should be noted that the invention is not limited thereto. In yet another embodiment, the first optical structure 122 may be formed together with the light guide plate 110 by injection molding, and the second optical microstructures 124 and 124A and the third optical microstructures 126 and 126A may be bonded to the light guide plate 110 using an optical adhesive or a double-sided adhesive.

Furthermore, as shown in FIG. 3A and FIG. 4, each of the second optical microstructures 124 and 124A protruding on the first connecting surface SC1 and each of the third optical microstructures 126 and 126A protruding on the second connecting surface SC2 respectively have a first surface S1 parallel to the side surface SS and a curved second surface S2, wherein the first surface S1 is disposed between the second surface S2 and the light source LS. Each of the second surfaces S2 is a continuous cambered surface, and a tangent line slope of each tangent of each of the second surfaces S2 with respect to the light incident surface SI gradually decreases in a direction from the light incident surface SI to the side surface SS.

Figure 5:
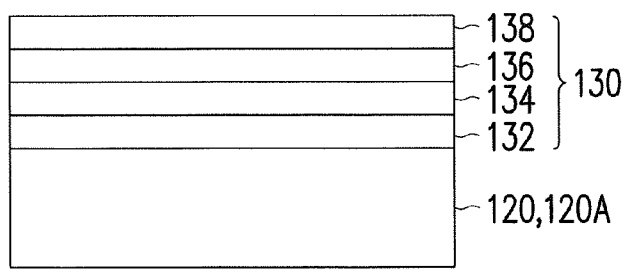
FIG. 5 is a partially-enlarged cross-sectional view of an optical structure according to an embodiment of the invention.

In an embodiment, a reflective layer may be formed on each of the second surfaces S2 and the cambered surface of the first optical structure 122, so as to enhance the reflection effects of the first optical structure 122, the second optical microstructures 124 and 124A, and the third optical microstructures 126 and 126A. FIG. 5 is a partially-enlarged cross-sectional view of the optical structure 120 according to an embodiment of the invention. As shown in FIG. 5, a reflective layer 130 is formed on the cambered surface of the optical structures 120 and 120A, wherein the reflective layer 130 is formed by stacking a plurality of thin films, for example. In more detail, the reflective layer 130 is formed by stacking a base layer 132, a metal layer 134, a covering layer 136, and a protective layer 138, for example, wherein a material of the base layer 132 and the covering layer 136 includes silicon dioxide or titanium dioxide; a material of the metal layer 134 may be silver or aluminum; and the protective layer 138 may be an ultraviolet ink layer or a rigid plastic material. However, it should be noted that the invention is not limited thereto. For example, in another embodiment, the reflective layer 130 may be a single-layer thin film or be formed by stacking the metal layer 134 and the covering layer 136 only. The reflective layer, composed of one single layer or multiple layers of different materials, may be formed on each second surface S2 and the cambered surface of the first optical structure 122 considering the optical effects of the light guide unit required, the material costs, or the processing difficulty. However, it should be noted that the invention is not limited thereto.

Figure 6A:
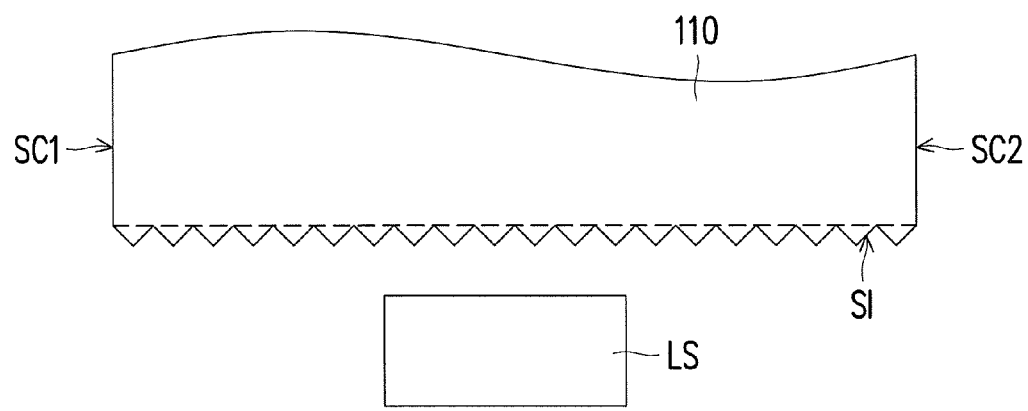
FIG. 6A and FIG. 6B are schematic partial top views of two light source modules according to an embodiment of the invention.
Figure 6B:
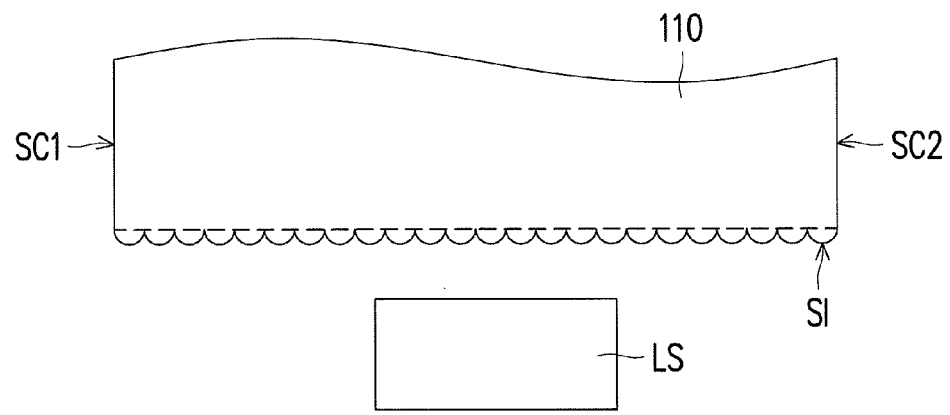

In the above embodiment, the light incident surface SI is a planar surface parallel to the side surface SS. Nevertheless, the invention is not limited thereto. In more detail, the dark area A2 of FIG. 2 is caused mainly because it is difficult to transmit the light beam B1' emitted by the light emitting unit to the area of the arc structure AA that is far away from the first light source group LS1 due to the restricted divergence angle and position of the light emitting unit (e.g. light emitting diode) in the first light source group LS1. To solve this problem, in this embodiment, the light incident surface SI is designed to increase the divergence angle of the light beam B1 after the light beam B1 enters the light guide plate 110. FIG. 6A and FIG. 6B are schematic partial top views of two light source modules according to an embodiment of the invention. As shown in FIG. 6A and FIG. 6B, the light incident surface SI may be a continuous zigzag surface or a continuous curved surface. In more detail, the light incident surface SI may include a plurality of sawtooth microstructures as shown in FIG. 6A, a plurality of semicircular microstructures as shown in FIG. 6B, or a sine wave-shaped structure (not shown), so as to increase the divergence angle of the light beam B1 entering the light guide plate 110. The aforementioned semicircular shape is not necessarily half of a circle and may be less, e.g. a bow shape. When viewed in the direction from the light source LS to the light incident surface SI, the sawtooth microstructures may be prisms and the semicircular microstructures may be partial columns. In addition, the sizes of the sawtooth microstructures and the semicircular microstructures are smaller than the size of the light source LS, for example. For example, the size of each sawtooth microstructure and each semicircular microstructure may be in a range of 25-50 micrometers.

Figure 7:
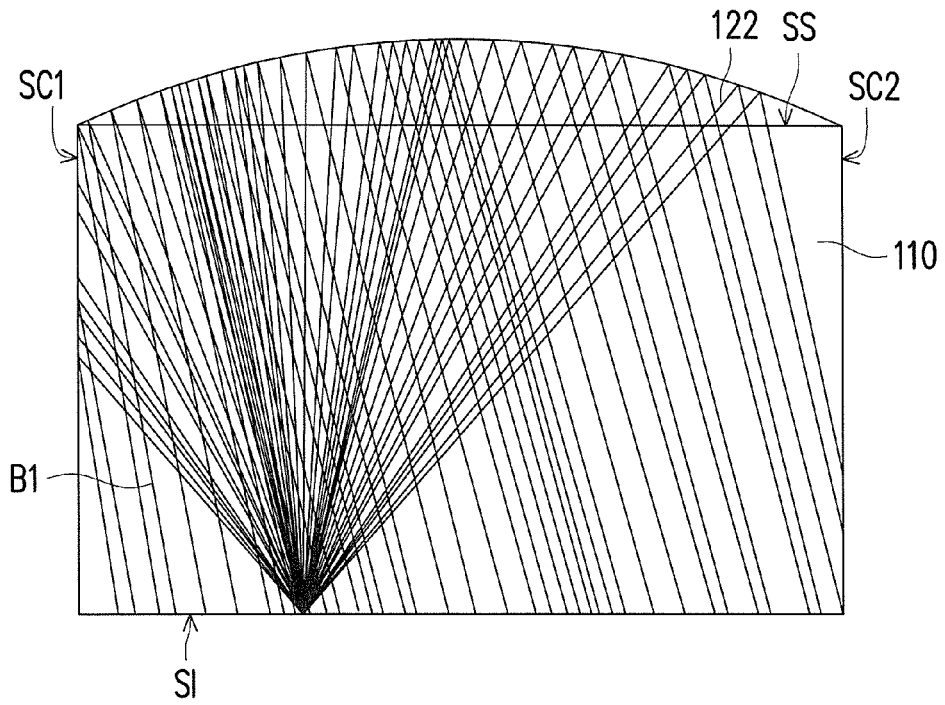
FIG. 7 illustrates an optical simulation result of a light guide unit according to an embodiment of the invention.
Figure 8:
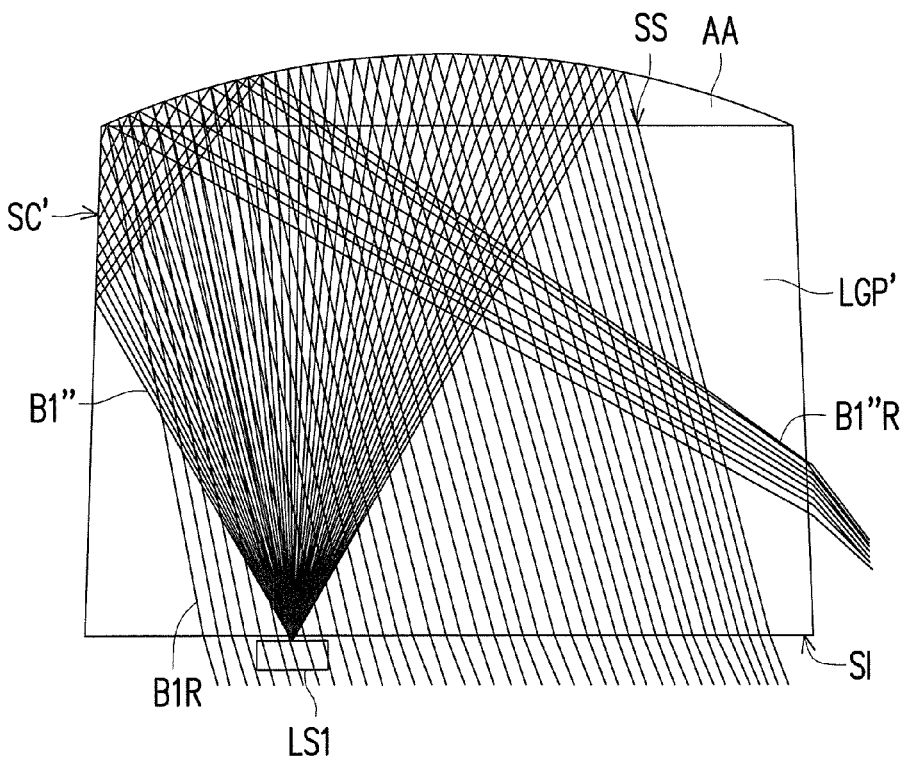
FIG. 8 illustrates an optical simulation result of a light guide unit of a comparative example.

FIG. 7 illustrates an optical simulation result of a light guide unit according to an embodiment of the invention. FIG. 8 illustrates an optical simulation result of a light guide unit of a comparative example, wherein FIG. 7 and FIG. 8 both illustrate the optical simulation result of one light source group, and FIG. 7 omits the second optical microstructures and the third optical microstructures. A light guide plate LGP' of FIG. 8 is approximately the same as the light guide plate LGP of FIG. 2, and a difference is that a connecting surface SC' of the light guide plate LGP' of FIG. 8 is formed with a reflective layer thereon.

Figure 1:
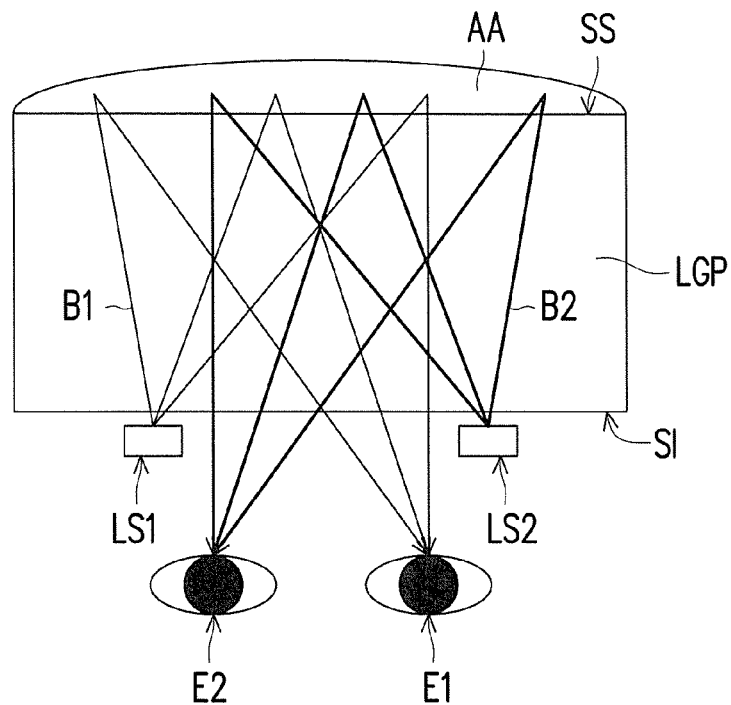
FIG. 1 is a schematic diagram illustrating an operating principle of naked eye stereoscopic display technology.

It is known from FIG. 2 that, due to the restricted divergence angle and position of the light emitting unit (e.g. light emitting diode) in the first light source group LS1, it is difficult for the conventional light guide structure to transmit the light beam B1' to the area of the arc structure AA that is far away from the first light source group LS1, and the large-angle light beam B1" directly emits out of the light guide plate LGP when transmitted to the connecting surface SC of the light guide plate LGP near the first light source group LS1. Therefore, the dark areas A1 and A2 are generated at diagonal sides of the light guide plate LGP. On the other hand, as shown in FIG. 8, if a reflective layer (not shown) is formed on the connecting surface SC' to improve the dark area A1 resulting from that the large-angle light beam B1" directly emits out of the light guide plate LGP', a transmission path B1"R of the light beam B1" transmitted to the connecting surface SC' and reflected by the reflective layer differs from a transmission path B1R of the light beam emitted to the arc structure AA and reflected by the arc structure AA. In stereoscopic display technology, transmission of the light beam B1" from the reflective layer deviates from a predetermined direction (e.g. the direction of the right eye E1 or the left eye E2 in FIG. 1) and causes crosstalk, which affects the display effect.

In contrast thereto, in the above embodiment of the invention, by disposing the second optical microstructures 124 and 124A and the third optical microstructures 126 and 126A of FIG. 3A or FIG. 4, the large-angle light beam B1" transmitted to the first connecting surface SC1 and the second connecting surface SC2 as shown in FIG. 2 is prevented from directly emitting out of the first connecting surface SC1 or the second connecting surface SC2 of the light guide plate 110, thereby improving the dark area A1 of FIG. 2 effectively. Moreover, in comparison with forming the reflective layer directly on the connecting surface SC of FIG. 8, in the embodiment of the invention, the optical structures 120 and 120A protruding on the side surface SS, the first connecting surface SC1, and the second connecting surface SC2 in FIG. 3A or FIG. 4 together constitute the Fresnel lens structure, such that the light beam emitted by the light source is properly transmitted in the predetermined direction (e.g. the directions of the left eye and the right eye) to achieve favorable display effects and improve the crosstalk of FIG. 8. Furthermore, by disposing the sawtooth microstructures shown in FIG. 6A or the semicircular microstructures shown in FIG. 6B, the divergence angle of the light beam B1 that enters the light guide plate 110 is increased effectively, so as to improve the dark area A2, which is caused because it is difficult for transmitting the light beam B1' to the area of the arc structure AA that is far away from the first light source group LS1.

Figure 9:
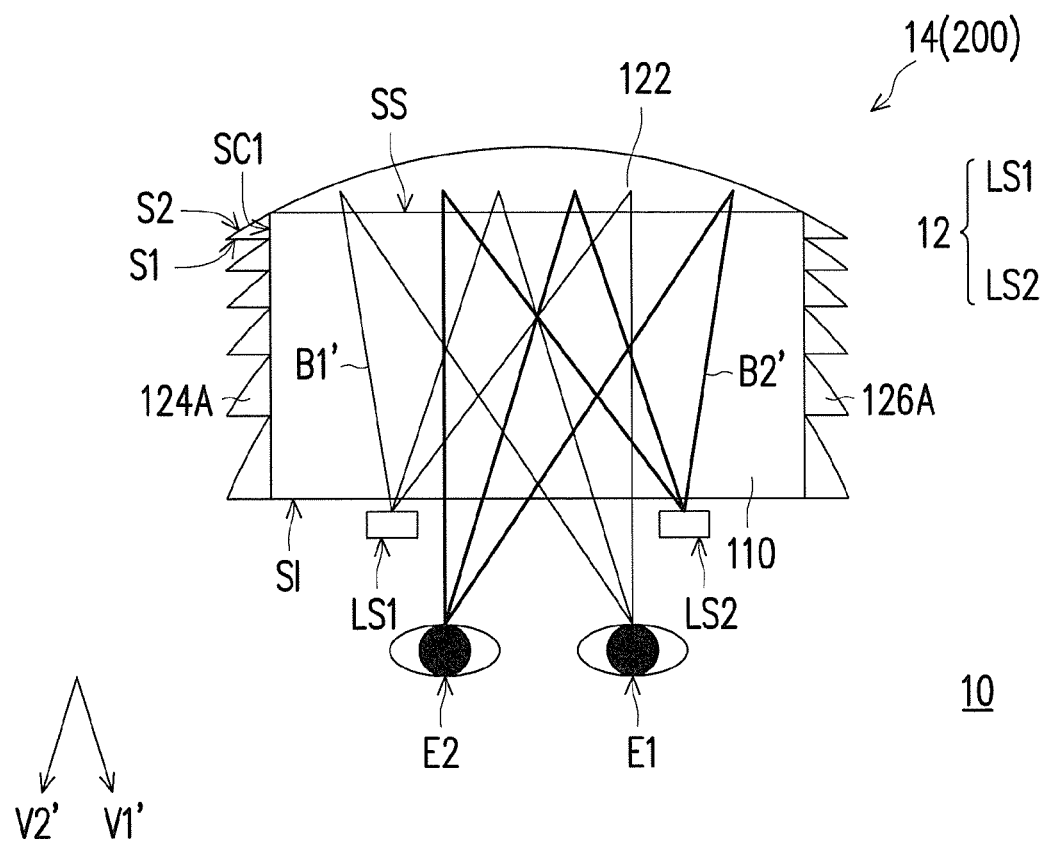
FIG. 9 is a schematic top view of a light source module according to an embodiment of the invention.

FIG. 9 is a schematic top view of a light source module according to an embodiment of the invention. With reference to FIG. 9, a light source module 10 includes a light source 12 and a light guide unit 14, wherein the light guide unit 14 is the light guide unit 200 of FIG. 4, and other identical components are denoted by the same reference numerals. Nevertheless, it should be noted that the invention is not limited thereto, and the light guide unit 14 may also be the light guide unit 100 of FIG. 3A. The light source 12 includes a plurality of light emitting diodes (two are illustrated in the figure, but the invention is not limited thereto), for example, and the light emitting diodes are arranged in a direction perpendicular to the first connecting surface SC1. When the light source module 10 is applied to a sequential naked eye stereoscopic display device, the light source 12 may be divided into a first light source group LS1 and a second light source group LS2, wherein the first light source group LS1 and the second light source group LS2 respectively include at least one light emitting diode. The number of the light emitting diodes may be varied according to a directionality requirement of the light source module. For example, if the first light source group and the second light source group respectively include two light emitting diodes, the light source module for two users can simultaneously emit directional light in the directions of the left eye and the right eye of the each user. However, it should be noted that the invention is not limited to the above. During stereoscopic display, the first light source group LS1 and the second light source group LS2 are turned on alternately, and the Fresnel lens structure (including the first optical structure 122, the second optical microstructures 124A, and the third optical microstructures 126A) is used to transmit the light beam BF emitted by the first light source group LS1 in a first direction V1' and transmit the light beam B2' emitted by the second light source group LS2 in a second direction V2', wherein the second direction V2' intersects the first direction V1'. Accordingly, with use of a display panel, the right eye E1 and the left eye E2 of the user respectively receive display images with parallax to form a stereo image in the user's head. In particular, because the light guide unit 14 improves the dark area phenomenon and transmits the light beams from different light source groups in the predetermined directions, e.g. the first direction V1' of the right eye E1 and the second direction VT of the left eye E2, the display device using the light source module 10 provides favorable display effects (e.g. uniform brightness and low interference).

In conclusion of the above, the embodiments of the invention achieve at least one of the following advantages or effects: In the above embodiments of the invention, a plurality of optical structures are disposed on the first connecting surface and the second connecting surface of the light guide plate to prevent the large-angle light beam transmitted to the first connecting surface and the second connecting surface from emitting out of the light guide plate directly through the first connecting surface or the second connecting surface, so as to increase light utilization and effectively improve the dark area problem. In addition, because the optical structures protruding on the side surface, the first connecting surface, and the second connecting surface together form the Fresnel lens structure, the light beams emitted by different light source groups are properly guided toward the predetermined directions (e.g. directions of the left and right eyes), thereby reducing crosstalk and generating a favorable display effect.

The foregoing description of the preferred embodiments of the invention has been presented for purposes of illustration and description. It is not intended to be exhaustive or to limit the invention to the precise foini or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A light guide unit adapted to be disposed beside a light source, and the light guide unit comprising:
   a light guide plate, comprising a bottom surface, a light emitting surface, a light incident surface, a side surface, a first connecting surface, and a second connecting surface, wherein the bottom surface is opposite to the light emitting surface; the light incident surface, the side surface, the first connecting surface, and the second connecting surface are respectively connected between the bottom surface and the light emitting surface; and the light incident surface is disposed between the light source and the side surface; and
   a plurality of optical structures, protruding on the side surface, the first connecting surface, and the second connecting surface, and the optical structures together forming a Fresnel lens structure.

2. The light guide unit according to claim 1, wherein the optical structures comprise at least one first optical structure protruding on the side surface, a plurality of second optical microstructures protruding on the first connecting surface, and a plurality of third optical microstructures protruding on the second connecting surface.

3. The light guide unit according to claim 2, wherein each of the second optical microstructures protruding on the first connecting surface and each of the third optical microstructures protruding on the second connecting surface respectively comprise a first surface parallel to the side surface and a curved second surface, wherein the first surface is disposed between the second surface and the light source.

4. The light guide unit according to claim 3, wherein a reflective layer is formed on each of the second surfaces.

5. The light guide unit according to claim 3, wherein each of the second surfaces is a continuous cambered surface.

6. The light guide unit according to claim 3, wherein a tangent line slope of each tangent of each of the second surfaces with respect to the light incident surface gradually decreases in a direction from the light incident surface to the side surface.

7. The light guide unit according to claim 3, wherein a refractive index of at least one of the optical structures is different from a refractive index of the light guide plate.

8. The light guide unit according to claim 1, wherein the light incident surface is a planar surface.

9. The light guide unit according to claim 1, wherein the light incident surface is a continuous zigzag surface.

10. The light guide unit according to claim 1, wherein the light incident surface is a continuous curved surface.

11. The light guide unit according to claim 1, wherein a thickness of the light guide plate on the side surface is larger than a thickness of the light guide plate on the light incident surface, and a partial thickness of the light guide plate gradually decreases in a direction from the side surface to the light incident surface.

12. The light guide unit according to claim 1, wherein a thickness of the light guide plate on the side surface is larger than a thickness of the light guide plate on the light incident surface, and a partial thickness of the light guide plate remains unchanged in the direction from the side surface to the light incident surface.

13. A light source module, comprising:
   a light source; and
   a light guide unit, comprising:
   a light guide plate, comprising a bottom surface, a light emitting surface, a light incident surface, a side surface, a first connecting surface, and a second connecting surface, wherein the bottom surface is opposite to the light emitting surface; the light incident surface, the side surface, the first connecting surface, and the second connecting surface are respectively connected between the bottom surface and the light emitting surface; and the light incident surface is disposed between the light source and the side surface; and
   a plurality of optical structures, protruding on the side surface, the first connecting surface, and the second connecting surface, and together forming a Fresnel lens structure, wherein the light source comprises a first light source group and a second light source group, and the Fresnel lens structure is adapted to transmitting a first light beam emitted by the first light source group in a first direction and transmitting a second light beam emitted by the second light source group in a second direction, wherein the second direction intersects the first direction.

14. The light source module according to claim 13, wherein the optical structures comprise at least one first optical structure protruding on the side surface, a plurality of second optical microstructures protruding on the first connecting surface, and a plurality of third optical microstructures protruding on the second connecting surface.

15. The light source module according to claim 14, wherein each of the second optical microstructures protruding on the first connecting surface and each of the third optical microstructures protruding on the second connecting surface respectively comprise a first surface parallel to the side surface and a curved second surface, wherein the first surface is disposed between the second surface and the light source.

16. The light source module according to claim 15, wherein a reflective layer is formed on each of the second surfaces.

17. The light source module according to claim 15, wherein each of the second surfaces is a continuous cambered surface.

18. The light source module according to claim 15, wherein a tangent line slope of each tangent of each of the second surfaces with respect to the light incident surface gradually decreases in a direction from the light incident surface to the side surface.

19. The light source module according to claim 15, wherein a refractive index of at least one of the optical structures is different from a refractive index of the light guide plate.

20. The light source module according to claim 13, wherein the light incident surface is a planar surface.

21. The light source module according to claim 13, wherein the light incident surface is a continuous zigzag surface.

22. The light source module according to claim 13, wherein the light incident surface is a continuous curved surface.

23. The light source module according to claim 13, wherein a thickness of the light guide plate on the side surface is larger than a thickness of the light guide plate on the light incident surface, and a partial thickness of the light guide plate gradually decreases in a direction from the side surface to the light incident surface.

24. The light source module according to claim 13, wherein a thickness of the light guide plate on the side surface is larger than a thickness of the light guide plate on the light incident surface, and a partial thickness of the light guide plate remains unchanged in the direction from the side surface to the light incident surface.

* * * * *